Jan. 4, 1966 | A. D. McGREGOR | 3,228,004
LOGICAL TRANSLATOR
Filed March 7, 1960 | 3 Sheets-Sheet 1
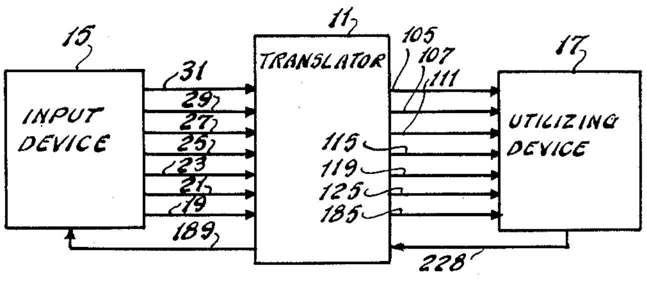
Fig. 2
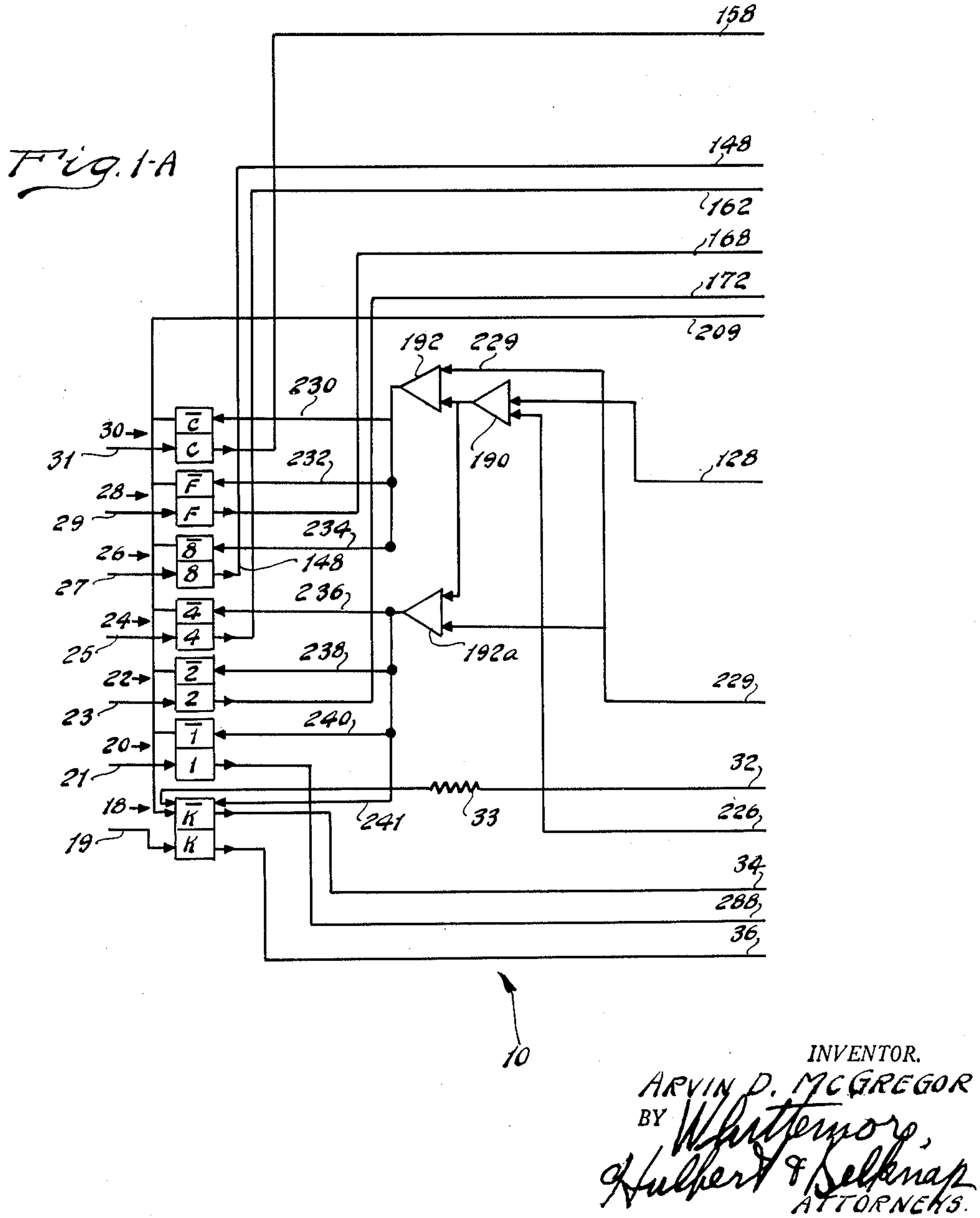
Fig. 1-A
INVENTOR.
ARVIN D. McGREGOR
BY Whittemore, Hulbert & Belknap
ATTORNEYS.

Fig 1-B
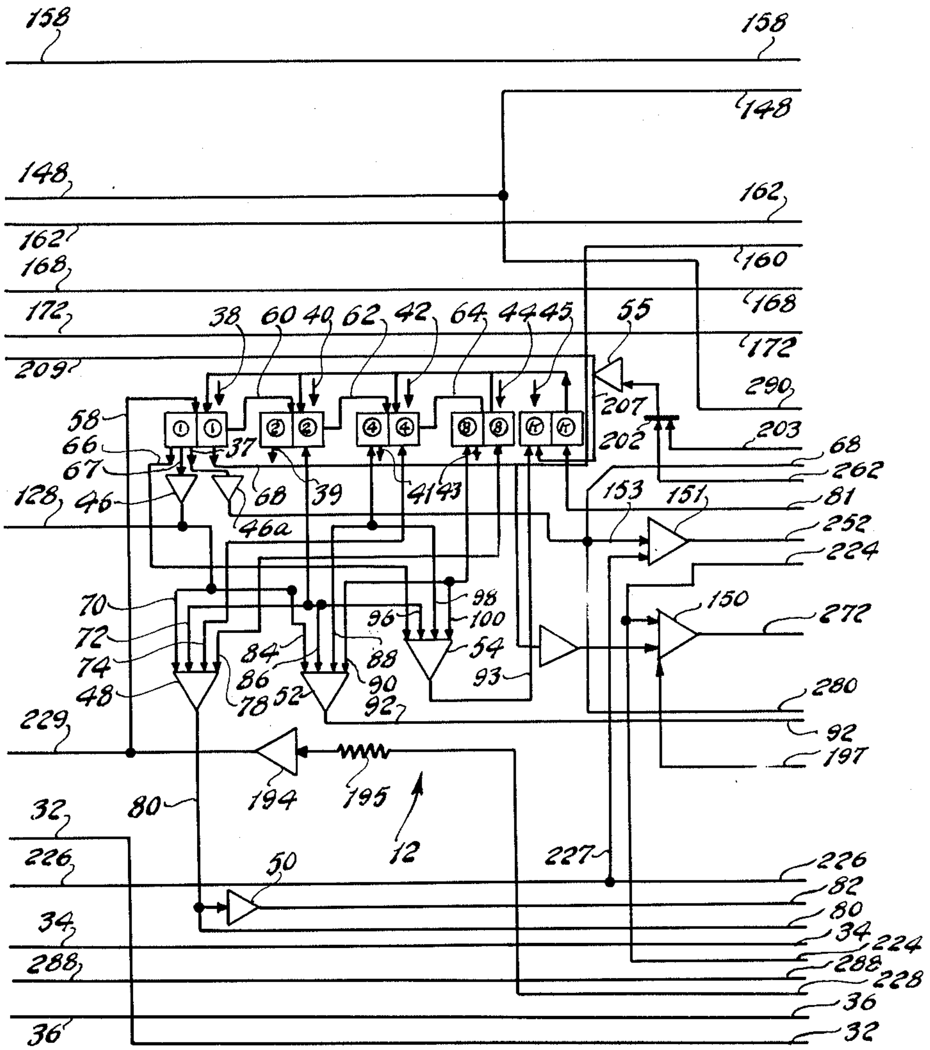
INVENTOR.
ARVIN D. McGREGOR
BY Whittemore, Hulbert & Belknap
ATTORNEYS.

Jan. 4, 1966 A. D. McGREGOR 3,228,004
LOGICAL TRANSLATOR
Filed March 7, 1960 3 Sheets-Sheet 3
Fig 1-C
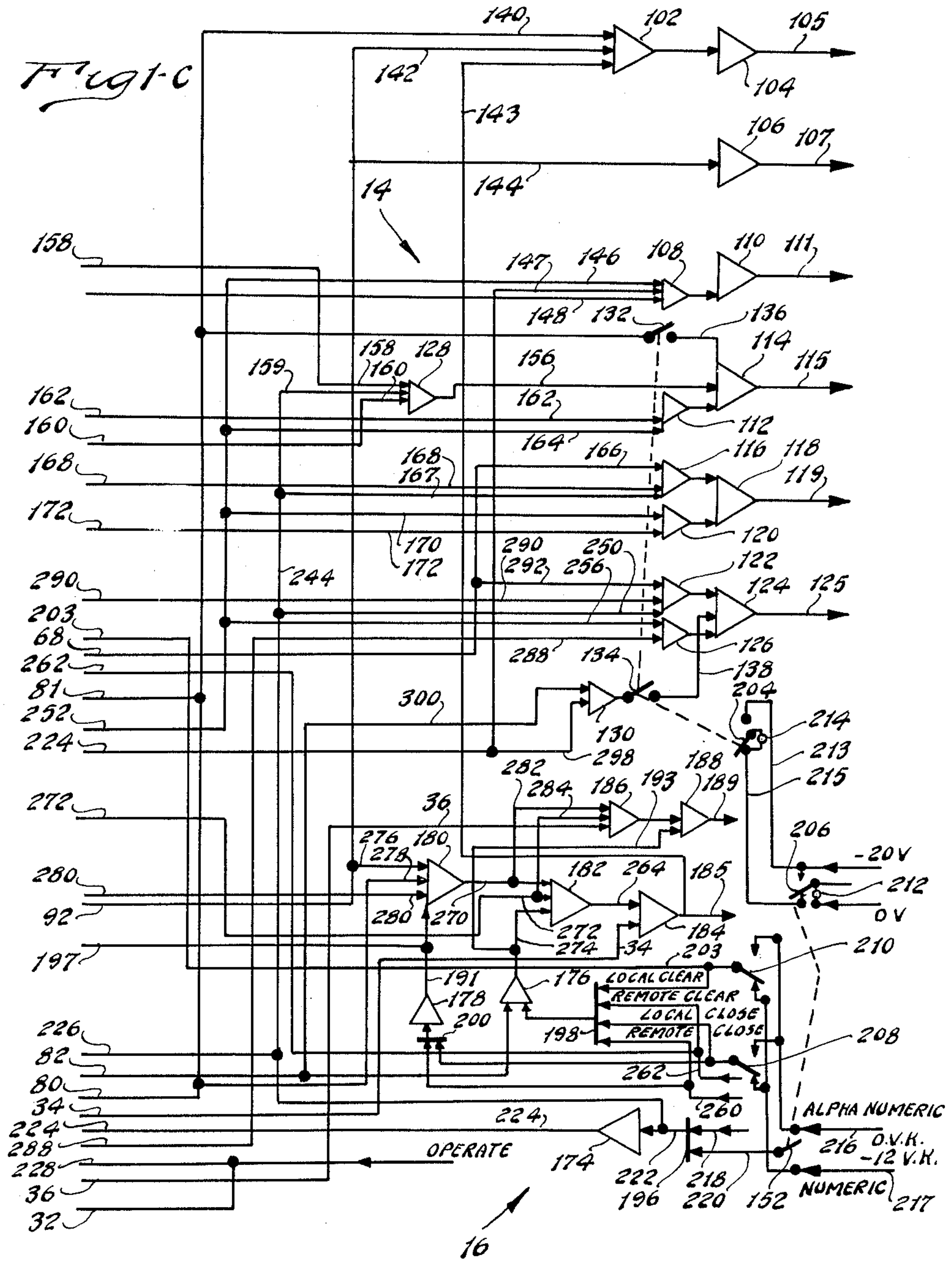
INVENTOR.
ARVIN D. McGREGOR
BY Whittemore Hulbert & Belknap
ATTORNEYS.

United States Patent Office 3,228,004
Patented Jan. 4, 1966

3,228,004
LOGICAL TRANSLATOR

Arvin D. McGregor, Birmingham, Mich., assignor, by mesne assignments, to Control Data Corporation, Minneapolis, Minn., a corporation of Minnesota Filed Mar. 7, 1960, Ser. No. 13,287
17 Claims. (Cl. 340—172.5)

The invention relates to a translator and refers more specifically to a translator of the logical type, transistorized and capable of operating in both an alpha numeric and a numeric mode wherein binary coded information arrives at the input to the translator in a form unsuited for application to a computer and binary coded information is delivered at the output of the translator in a form suitable for application to a computer.

It often happens in computer work that coded information is received from electronic devices which it is desired to apply to a particular computer, but which is in a form unsuitable for application to the computer. In the past it has been the practice to record the received code as on punched tape, manually to translate the received information into a form suitable for use with the contemplated computer, record the translated form of the information and apply the recorded translated form of the information to the computer. Such manual translation of coded signals from unusable to usable form is tedious, conducive to errors and wasteful of the time of skilled personnel.

Therefore it is one of the purposes of the present invention to provide electronic means to translate electric signals unsuitable for a desired computer application in their received form into a form suitable for such application.

Another purpose is to provide electronic means capable of operating in different modes to translate both alpha numeric and numeric coded signals received in a form undesirable for the use intended therefor into a desirable form, including means for switching between said modes.

Another purpose is to provide electronic translating means capable of selectively operating in an alpha numeric or numeric mode and receiving input signals comprising alpha numeric or numeric coded information signals in binary form and translating the received information into multi-frame computer words including mode of operation, sign, and finish frames, there being twice as many output frames including coded input information as there are groups of input information signals when the input information signals are in alpha numeric code and the translating means is operating in the alpha numeric mode.

Another purpose is to provide electronic means to translate electric signals unsuited for a desired computer application in their received form into a form suitable for use including means for stopping the input to said means and giving a warning when particular undesirable conditions exist in devices associated with said first mentioned means.

More specifically it is a purpose of the present invention to provide means for translating numeric information including sign designation into a plurality of multi-frame computer words including means to automatically signify the end of a computer word and complete a computer word if the information being translated stops other than at the end of a word.

More specifically it is a purpose of the present invention to provide apparatus for translating alpha numeric coded information in the form of a plurality of groups of simultaneously received signals representing binary coded numbers into multi-frame computer words including means for automatically finishing a word if the received information stops any place except at the end of a word, means automatically indicating the finish of a word and means automatically preparing for the start of a new word, said computer words having one binary coded number per frame of translated received information and there being twice as many frames of translated received information as there are groups of simultaneously received signals.

Other objects and features of the invention will become apparent as the description proceeds, especially when taken in conjunction with the accompanying drawings, illustrating a preferred embodiment of the invention, wherein:

FIGURES 1–A, 1–B and 1–C are in combination a logic diagram of a translator according to the invention.

FIGURE 2 is a block diagram of a translator according to the invention as shown in FIGURES 1–A, 1–B and 1–C connected as it would be in use between an input device and a utilization device.

A specific embodiment of the invention is illustrated diagrammatically in FIGURES 1–A, 1–B and 1–C. The embodiment of the invention illustrated includes an input circuit generally designated 10, a counting circuit generally designated 12, an output circuit 14, a control circuit generally designated 16 and suitable connections therebetween as shown.

It will be recognized that power supply means to energize the diagrammatically shown individual detailed circuits of the input, counting, output and control circuits both regulated and unregulated must also be supplied where needed. Since such power supply means form no part of the present invention and are well known in the art they are not shown and will be mentioned only briefly where it appears to clarify the specification to do so.

The translator of the invention 11 operates between an input device 15 such for example as a Flexowriter which feeds information thereto in a form unsuited for a desired use in a utilizing device such as a Datatron and the utilizing device 17 to translate the information it receives into a form suitable for use in the utilizing device. The particular translator illustrated functions in both an alpha numeric and numeric mode.

In the alpha numeric mode the translator 11 receives an input comprising a simultaneous group of signals representing alpha numeric coded information in two digit binary coded form, representing either a letter or a numeral, and a key pulse and produces therefrom two outputs each comprising one binary coded digit, a clock signal to indicate that the code is information instead of instruction, and a signal operable to cause the output signals of the translator to be recorded.

The translator operating in the alpha numeric mode also groups its own output into groups of 13 signals. The first signal indicates to an output device the mode of operation of the translator, that is whether the translator is operating in the numeric or alpha numeric mode. The second signal indicates the sign of the output of the translator which in the preferred embodiment under consideration here is always positive in the alpha numeric mode of operation. The next ten signals are coded input information in what may be considered a folded form since there are two time spaced output signals for each input signal. The thirteenth signal is a finish signal to indicate to the utilization device that a computer word or ten information carrying signals have been produced by the translator.

In the numeric mode of operation the input signals represent numbers only and for each input the translator produces a single output. The grouping of the output into computer words is however the same as for alpha numeric operation and in either mode of operation the translator is provided with internal means to prevent output errors due to too rapid feeding of input information thereof. The translator 11 is also provided in either mode of operation with means operable to automatically complete a group of 13 signals with a 0 indication or to start over with a new group of 13 signals at any time.

The input circuit 10 as shown comprises bistable multivibrators 18, 20, 22, 24, 26, 28 and 30 located adjacent input connectors 19, 21, 23, 25, 27, 29 and 31 respectively. The input circuit multivibrators are of the transistorized type, the detailed schematic and operation of which is well known and will not be considered here. The input multivibrators are each split diagrammatically in FIGURE 1 into two parts, K, $\overline{K}$; 1, $\overline{1}$; 2, $\overline{2}$; 4, $\overline{4}$; 8, $\overline{8}$; F, $\overline{F}$ and C, $\overline{C}$. Each of the parts of each multivibrator includes input and output connections as shown.

The electrical characteristics of each of the multivibrators in the translator is similar and will be briefly discussed in connection with multivibrator 18. The output signal from either side of energized multivibrator 18 will be either 0 or −12 volts depending on which side of the multivibrator received the last input signal. That side of the multivibrator receiving the last input signal will have a 0 volt output, the other side will have a −12 volt output.

Specifically, if the last input signal to multivibrator 18 has been from the conductor 32 to the side $\overline{K}$ the multivibrator will have an output signal of 0 volts on conductor 34 from side $\overline{K}$ and an output signal of −12 volts on output conductor 36 from side K. Should an input signal then be fed to side K through input conductor 19 the output signal from side K would change to 0 volts and that from side $\overline{K}$ would change to −12 volts until an input signal is again provided to side $\overline{K}$ at which time the voltage would again reverse in the manner of well known bi-stable multivibrators.

The particular outputs of −12 and 0 volts from the input circuit multivibrators have been chosen to represent a logic level of 0 and 1 respectively in the translator illustrated and when reference is made in the consideration of the complete logic diagram of FIGURES 1–A, 1–B and 1–C to the 0 or 1 logic level it will be understood that voltages of −12 or 0 volts respectively are referred to. It will be understood that different reference voltages could be used in the translator of the invention other than the −12 and 0 volts chosen for the preferred embodiment.

Input conductors to and output conductors from multivibrators 18, 20, 22, 24, 26, 28 and 30 are provided as shown best in FIGURE 1–A and connect the input multivibrators to the control circuit 16 illustrated in FIGURE 1–C, the input device 15 over conductors 19, 21, 23, 25, 27, 29 and 31 and the output circuit 14 also illustrated in FIGURE 1–C. Arrow heads on the conductors pointing towards a multivibrator or other circuit indicate that the conductor is an input conductor with respect to that circuit. Arrow heads pointing away from the multivibrators or other circuits indicate output conductors.

The counting circuit 12 comprises a series of bi-stable multivibrators 38, 40, 42, 44 and 45 similar to those of the input circuit 10 and having sides ①, $\overline{①}$; ②, $\overline{②}$; ④, $\overline{④}$; ⑧, $\overline{⑧}$ and Ⓡ, $\overline{Ⓡ}$ respectively, and also includes logical nor circuits 46, 46*a*, 48, 50, 52 and 54. The basic nor circuit is also known in the art and will not therefore be considered in detail here.

Input and output connections to the multivibrators and nor circuits of the counting circuit 12 are as shown. The same conventions are used in the counting circuit with respect to voltage levels and logic levels as was explained in connection with the input circuit. Logic levels of 0 or −12 volts represent a logical 1 or 0 respectively.

The nor circuits 46, 46*a*, 48, 50, 52 and 54 operate to produce an output at a 1 logic level if any input thereto is at a 0 logic level and to produce a 0 logic level output if all inputs thereto are at the 1 logic level. The same is true of the nor circuits used throughout the translator shown in the figures.

In the operation of the counting circuit 12 a 0 logic level signal is first fed from the $\overline{Ⓡ}$ side of multivibrator 45 to the parts indicated $\overline{①}$, $\overline{②}$, $\overline{④}$ and $\overline{⑧}$ of multivibrators 38, 40, 42 and 44 as indicated. As explained in connection with the bi-stable multivibrators in the input circuit a signal into one part of the multivibrators of the counting circuits will cause the output from that part to be a 1 logic level and the output from the other part to be a 0 logic level until an input signal is fed to the other part of the multivibrator at which time the output of the two parts is reversed. Thus after application of the signal from multivibrator 45 the multivibrators 38, 40, 42 and 44 will have an output of logic level 0 from parts ①, ②, ④ and ⑧ thereof which in terms of the usual binary coding system indicates the number 0. After application of the signal from multivibrator 45 the output from parts $\overline{①}$, $\overline{②}$, $\overline{④}$ and $\overline{⑧}$ of the multivibrators will be at the logic level 1. The counting circuits are now ready to begin a counting sequence.

With the counting circuit it is desired to count signals received over conductor 58 which is connected to the input of both parts ① and $\overline{①}$ of multivibrator 38. This complementary input to multivibrator 38 may be accomplished by use of input circuits old in the art in conjunction with the multivibrator circuits of FIGURE 1–B. Such complementary input circuit serves to permit a signal on conductor 58 to reverse the outputs of both halves of multivibrator 38 without regard to the part ① or $\overline{①}$ which received the last input signal.

A signal for reversing the output levels of multivibrator 38 is received on conductor 58 each time an output from the translator has been utilized by the utilization device 17 through means not a part of this invention by way of conductors 228 and 229. On reception of the first signal from conductor 58 by multivibrator 38 the output from the part ① and $\overline{①}$ thereof reverse becoming a 1 logic level and a 0 logic level respectively. The outputs from parts ②, ④ and ⑧ of multivibrators 40, 42 and 44 continue at the 0 logic level and so considering parts ①, ②, ④ and ⑧ of the counting circuit multivibrators a 1 count in the binary code is present.

At the next signal from conductor 58 received by multivibrator 38 the output of the parts ① and $\overline{①}$ again reverses, the output of part ① changing back to a 0 logic level and the output of part $\overline{①}$ changing back to a 1 logic level. On the changing of the output of part $\overline{①}$ from a 0 logic level to a 1 logic level a signal is produced in multivibrator 38 which is fed through conductor 60 to multivibrator 40 by means of a circuit similar to that discussed in connection with the input of conductor 58 to multivibrator 38. The signal thus fed to mulitvibrator 40 causes the output from the parts ② and $\overline{②}$ to change to a 1 logic level and a 0 logic level respectively. Therefore considering the multivibrator parts ①, ②, ④ and ⑧ as before a binary coded 2 is now indicated by their logic level outputs. It will be remembered that the binary 2 indication has resulted from the reception of the second signal on conductor 58 after a signal from multivibrator 45 caused the multivibrators 38, 40, 42 and 44 to present logic level outputs from parts ①, ②, ④ and ⑧ thereof representing a binary coded 0.

On reception of the next signal from conductor 58 the logic level output from parts ① and $\overline{①}$ again reverses as it did on receipt of the first signal from conductor 58 and becomes 1 and 0 respectively. Since part $\overline{①}$ has changed logic level outputs from 1 to 0 rather than from 0 to 1 no signal is fed through conductor 60 to multivibrator 40 and the outputs from parts ② and $\overline{②}$ thereof remains as before at the 1 and 0 logic levels respectively. Therefore again considering parts ①, ②, ④ and ⑧ of multivibrators 38, 40, 42 and 44, the logic level outputs thereof is now 1, 1, 0, 0 respectively or 3 in the usual binary coded number system.

In a similar manner to that described above subsequent signals received at multivibrator 38 over conductor 58 and signals received at the similar multivibrators 40, 42 and 44 over similar conductors 60, 62 and 64 will cause the logical output of the multivibrators to change between the 0 and 1 levels in such a manner that the logical output levels from parts ①, ②, ④ and ⑧ will always indicate in binary coded form the number of pulses which has been received over conductor 58 at multivibrator 38 after a signal from multivibrator 45 has set the counting multivibrators so that their logic level output from sides ①, ②, ④ and ⑧ represents a binary coded 0.

The possible binary coded count of the multivibrators 38, 40, 42 and 44 connected as shown is of course limited to 15. The 15 count being signified by a 1 logic level output on each of parts ①, ②, ④ and ⑧ of the four multivibrators. On receipt of the sixteenth pulse from conductor 58 after a signal from nor circuit 55 the multivibrators functioning as above indicated would again indicate a 0 in binary coded form. However, as will be seen in the consideration of the nor circuits 46, 46*a*, 48, 50, 52 and 54 a count of 13 is all that is required of the counting circuits in the operation of the present translator before they are automatically reset to a 0 count by a signal from multivibrator 45.

As shown in FIGURE 1–B the alternating 0 and 1 logic level output signals of both halves of multivibrator 38 on conductors 66, 67, 37 and 68 are utilized to cause signals to be produced by other circuits in the translator on particular counts of the counting circuit as will be presently described. It will also be noted that output conductors 39, 41 and 43 are provided from sides ②, ④ and ⑧ of multivibrators 40, 42 and 44 respectively. The signals on these conductors may be used in conjunction with the signal on conductor 37 from side ① of multivibrator 38 on a control panel (not shown) if such indication is desired.

Nor circuits 46 and 46*a* connected to the part ① of multivibrator 38 by conductors 67 and 37 are provided to produce sufficient output signals of the logic level normally found in the output of part ①̅ of the multivibrator 38 to operate the circuits in the translator as required. It will be understood that nor circuits 46 and 46*a* are not an absolute necessity and are provided as only one of possible methods by which the desired result may be obtained. Since the outputs of the nor circuits 46 and 46*a* are a 0 logic level when the inputs thereto are all at a 1 logic level and the only input thereto is from the ① side of multivibrator 38, any time the ① side of multivibrator 38 has an output at a 1 logic level the output of nor circuits 46 and 46*a* will be a 0 logic level which is the same output as the part ①̅ of multivibrator 38 will have when the output of side ① is a 1 logic level. Similarly, since the output of nor circuits 46 and 46*a* are at a 1 logic level when any input thereto is at a 0 logic level, any time the output of part ① of multivibrator 38 is at a 0 logic level the output of nor circuits 46 and 46*a* will be a 1 logic level which will be the same as the output from the part ①̅ of the multivibrator 38 at this time.

Nor circuit 48 as indicated receives input signals over conductors 70, 72, 74 and 78 from nor circuit 46, part ②̅ of multivibrator 40, part ④̅ of multivibrator 42 and part ⑧̅ of multivibrator 44 respectively. In keeping with the previously discussed action of the nor circuits therefor there will be a logical 1 level output from nor circuit 48 any time a 0 logical level signal appears on any of the input conductors 70, 72, 74 or 78. There will be a 0 logic level output from nor circuit 48 any time all of the input signals thereto are at a 1 logic level. Therefore, considering the output from the side ① as inverted in nor circuit 46 and from sides ②̅, ④̅ and ⑧̅ of multivibrators 38, 40, 42 and 44 respectively during the counting sequence thereof as previously described, the only time the output of nor circuit 48 will be 0 is when the multivibrators logical output level on the sides ①, ②, ④ and ⑧ thereof represents the binary coded signal 0. At all other times in the counting sequence of the multivibrators to 15 counts at least one of the input signals to the nor circuit 48 will be at 0 logic level and the output of nor circuit 48 will therefore be at a logic level of 1.

As indicated by conductor 80 the output from nor circuit 48 is fed to the output circuit 14 and control circuit 16. The output of nor circuit 48 is also connected to side ®̅ of multivibrator 45 by conductor 81 and is used to reset multivibrator 45 on a 0 count of the counting circuit as later explained. Part of the output from nor circuit 48 is also inverted in logic level in nor circuit 50 which is similar to nor circuit 46 before it is fed to the circuits 14 and 16. In the manner previously explained the output of nor circuit 50 on conductor 82 will be at a 0 logic level when the output from nor circuit 48 is at a 1 logic level and will be at a 1 logic level when circuit 48 has a 0 logic level output.

Nor circuit 52 is similar to nor circuit 48 and has input connections as shown to the ① part of multivibrator 38 through conductor 84 and nor circuit 46, to the ②̅ part of multivibrator 40 by conductor 86, to the ④ part of multivibrator 42 by conductor 88, and to the ⑧ part of multivibrator 44 by conductor 90. With these input connections the output on conductor 92 from nor circuit 52 will be at the 1 logic level at all times except when the parts ①, ②, ④ and ⑧ of multivibrators 38, 40, 42 and 44 have a logic level output which is a binary coded 12 at which time all inputs to the nor circuit 52 will be at the 1 logic level and the output therefrom will be a 0 logic level as previously explained. As shown by conductor 92 the output of nor circuit 52 is fed to the output and control circuits 14 and 16.

Nor circuit 54 is similar to circuits 48 and 52 and as shown receives inputs over conductors 66, 96, 98 and 100 from parts ①, ②̅, ④ and ⑧ of multivibrators 38, 40, 42 and 44. In the manner previously explained the output from nor circuit 54 will be at the 1 logic level at all times except when the logic level outputs from parts ①, ②, ④ and ⑧ indicate a binary coded 13 count at which time the output over conductor 93 will be at a 0 logic level.

The 0 logic level output from nor circuit 54 is fed to multivibrator 45 to produce a 0 logic level output from side ®̅ thereof. The 0 logic level from side ®̅ of multivibrator 45 functions to reset the multivibrators 38, 40, 42 and 44 back to their state of operation immediately following the reception of the first signal from multivibrator 45 applied to the inputs of parts ①̅, ②̅, ④̅ and ⑧̅ of the counting circuit multivibrators to restart the counting cycle.

After multivibrator 45 has reset the multivibrators 38, 40, 42 and 44 on reception at side ® thereof of a 0 logic level output from nor circuit 54 it must itself be reset in preparation to receive a subsequent 0 logic level signal from nor circuit 54. A 0 logic level reset signal for multivibrator 45 is supplied by multivibrator 48 over conductors 80 and 81 on a 0 count of counting circuit 12 as previously indicated to the ®̅ side of multivibrator 45.

From the above it should now be evident that the counting circuit 12 serves to count the number of signals received over conductor 58 following a 0 logic level signal received by the multivibrators 38, 40, 42 and 44 from multivibrator 45. Up to 13 input signals may be cyclically counted by the counting circuit. Receipt of the thirteenth signal will cause the counting circuit to be reset at 0. It should also be evident that signal outputs are supplied from the counting circuit at a 1 or 0 logic level from parts ① and ①̅ of multivibrator 38 to the control and output circuits 14 and 16 and that outputs to the control and output circuits 14 and 16 are also provided from nor circuits 48 and 52 to the 0 logic level on 0 and 12 counts respectively and at the 1 logic level at other times. As previously indicated the nor circuits 46, 46*a* and 50 serve only to invert the logic levels of the inputs received thereby. The use of the output signals from the counting circuit 12 will be explained in conjunction with the output circuits 14 and control circuits 16.

Output circuit 14 includes nor circuits 102, 104, 106, 108, 110, 112, 114, 116, 118, 120, 122, 124, 126, 128 and 130 connected as shown. Mechanically connected switches 132 and 134 in conductors 136 and 138 to nor circuits 114 and 124 respectively are also part of output circuit 14. All of the nor circuits of the output circuit 14 are similar to that described in connection with counting circuit 12. If the inputs thereto are all at a 1 logic level the outputs thereof will be at a 0 logic level. With a 0 logic level signal on any input to the nor circuits the output therefrom will be at a 1 logical level.

Considering nor circuit 102 it can be seen that signal inputs thereto on conductors 140 and 142 arrive thereat from nor circuits 48 and 52 of counting circuit 12 respectively. A further input to nor circuit 102 is provided over conductor 143 from nor circuit 184 of the control circuit. As previously indicated the signal from nor circuit 48 will be at 0 logic level only at the 0 count of the counting circuit. The signal from nor circuit 52 will be at the 0 logic level only on the 12 count of the counting circuit. The conductor 143 provides a 1 logic level at the times when the signals on conductors 140 and 142 are at a 1 level. During all counts of the counting circuit from and including 1 to and including 11 therefore all input signals to nor circuit 102 will be at a 1 logic level producing a 0 logic level output from circuit 102. During the 12 and 0 counts of the counting circuit one of the inputs to nor circuit 102 will be at the 0 logic level and the output therefrom will be at a logic level of 1.

The nor circuit 104 is provided as nor circuit 46 is in counting circuit 12 to invert the logic level of the signal received thereby from nor circuit 102. The combined output of nor circuits 102 and 104 on output conductor 105 therefore is at a logical 1 level during all counts except 0 and 12 of counting circuit 12 at which time the output is at a 0 logic level. The 1 logic level output serves as a clock pulse for indicating to the utilizing device that the code at that time is information and not instruction. Also due to the signal from conductor 143 the 1 logic level output from conductor 105 indicates that a 1 logic level signal has been sent to the utilizing device 17 over output conductor 115 to cause clutch mechanism of a recording device contained therein to operate.

Since nor circuit 106 is connected through conductors 144 and 92 to the output of nor circuit 52 in the counting circuit, nor circuit 106 serves only to invert the logical level at the output of nor circuit 52 as explained in consideration of nor circuit 46. The output of nor circuit 106 on output conductor 107 is therefore at a logic level of 1 only on the 12 count of counting circuit 12. The 1 level logical output of nor circuit 106 serves to indicate to the utilization device 17 that a 12 count and therefore a cycle of operation of the translator of the invention has been finished and that the counting circuit of the translator will be reset at 0 on the reception of the next subsequent signal from the conductor 58 at multivibrator 38 as previously described.

Output circuit nor circuit 110 serves to invert the output logic level of nor circuit 108 and thereby produce an output signal on output conductor 111 at a logic level of 1 anytime the input signals to nor circuit 108 over conductors 146, 147 and 148 are all at a 1 logic level producing a 0 logic level output from nor circuit 108.

As shown conductor 148 is directly connected to the output of part 8 of input multivibrator 26 and as previously explained a 1 level logic signal will be produced at the output of part 8 of multivibrator 26 when an input signal from a source outside the translator is felt on the input conductor 27 and will remain until an input signal is fed to part $\overline{8}$ of multivibrator 26. Therefore, after appearance of an input signal on conductor 27 the input signal on conductor 148 to nor circuit 108 will be at the 1 logic level until an input signal is received at part $\overline{8}$ of multivibrator 26.

Conductor 146 as indicated is connected to nor circuit 151 in the control circuit through conductor 252. Nor circuit 151 produces a 1 logic level signal output whenever part ① of multivibrator 38 has a 1 logic level output or operation mode switch 152 in the control circuit is in the numeric position as will later be explained.

Connector 147 is connected to control circuit nor circuit 174 through conductor 224 and is provided therefrom a 1 logic level signal when the translator is operating in the numeric mode and a 0 logic level signal in alpha numeric operation as will later be explained.

Therefore an output of a 1 logic level will appear on output conductor 111 of the translator when an input signal appears on input conductor 27 thereof and the switch 152 is in the numeric position. A 1 logic level signal output on output conductor 111 indicates a binary coded 8 to a utilization device with the translator operating in a numeric mode as will later be seen. No 1 logic level output from nor circuit 110 is possible with the translator operating in an alpha numeric mode.

Nor circuit 114 will produce a 1 logic level output on output conductor 115 any time the input thereto through switch 132 on conductor 136 or from nor circuit 128 or nor circuit 112 is at the 0 logic level. A 1 logic level output on output conductor 115 indicates a binary coded 4 to utilizing device 17 as will later be evident.

A binary coded 4 output from the translator on a 0 count of the counting circuit 12 indicates to the utilizing device 17 that the translator is operating in an alpha numeric mode. Such an output is present on conductor 115 with switch 132 closed on a 0 count since conductor 136 is coupled to counting circuit nor circuit 48 through conductor 81. Should the switch 132 be open on a 0 count no output will be recorded from the translator by the utilizing device as will later be seen.

A 0 logic level output from nor circuit 128 on conductor 156 will be obtained when the input signals thereto on conductors 158, 159 and 160 are set all at 1 logic levels as previously explained. In the manner explained in connection with multivibrator 30 a 1 logic level signal will appear on conductor 158 when an input signal to the translator appears on input conductor 31 in the input circuit 10. A 1 logic level signal will be present on conductor 159 any time switch 152 in the control circuit 16 is in the alpha numeric position as will be explained later. A 1 logic level signal on conductor 160 will be obtained from part ① of multivibrator 38 on even counts of the counting circuit 12 in the manner previously explained.

Similarly a 0 logic level output from nor circuit 112 will be obtained when the input signals thereto on conductors 162 and 164 are both at the 1 logic level. In the manner previously described the input signal on conductor 162 will be at a logic level of 1 after a signal from input conductor 25 is received by part 4 of multivibrator 24 in the input circuit 10. Likewise, as explained in connection with the signal appearing on conductor 146, a logical 1 level signal will be present on conductor 164 any time an odd number is counted by counting circuit 12 or when switch 152 is in the numeric position.

In summary a logical 1 level signal will be present on output conductor 115 any time counting circuit 12 counts 0 and switch 132 is closed, or any time the last input signal to multivibrator 30 has been from input conductor 31, switch 152 is in the alpha numeric position and the counting circuit counts an even number, or any time the last input signal to multivibrator 24 has been from input conductor 25 and the count in the counting circuit is an odd number or switch 152 is in the numeric position.

An output signal at the logical 1 level will be present on output conductor 119 from nor circuit 118 any time the input thereto from nor circuit 116 or nor circuit 120 is at the logical 0 level. Nor circuit 116 or 120 will have a logical 0 level output any time all the inputs thereto on conductors 166, 167 and 168 or on conductors 170 and 172 respectively are at a 1 logic level. In the manner similar to the operation of previously discussed nor circuit 128, conductor 166 to nor circuit 116 will have a 1 logic level signal thereon any time the counting circuit 12 counts an even number, conductor 167 will have a 1 logic level signal thereon when switch 152 is in the alpha numeric position, and input conductor 168 will have a 1 logic level signal thereon any time the last input signal to multivibrator 28 has been from conductor 29. In the manner of opertion of nor circuit 112, the input signals to nor circuit 120 from conductor 170 will be at the 1 logic level any time the counter counts an odd number or any time switch 152 is in the numeric position. A 1 logic level signal will be present on input conductor 172 any time the last input signal to multivibrator 22 in the input circuit 10 has been over input conductor 23.

An output signal at the 1 logic level from nor circuit 118 indicates to a utilization device a binary coded 2 on output conductor 119 of the translator. In summary a 1 logic level will be present on output conductor 119 any time the counting circuit 12 counts an even number, switch 152 is in the alpha numeric position, and the last input to multivibrator 28 has been on input conductor 29 or any time the counting circuit 12 counts an odd number or switch 152 is in the numeric position and the last input to multivibrator 22 has been on input conductor 23.

Similarly an output signal at the 1 logic level will be present on output conductor 125 from nor circuit 124 any time the input signal thereto from nor circuit 122 or nor circuit 126 is at the 0 logic level. Additionally the output on conductor 125 will be at a 1 logic level is nor circuit 130 is at the 0 logic level and switch 134 is closed. An output signal at the 1 logic level on output conductor 125 indicates a binary coded 1 to utilization device 17.

In the previously indicated manner the output signal from nor circuit 122 will be at a 0 logic level any time the counter counts an even number, the last input to multivibrator 26 has been over input conductor 27 and switch 152 is in the alpha numeric position. The output signal from nor circuit 126 will be at the 0 logic level any time the last input to multivibrator 20 has been over input conductor 21 and the counter counts an odd number or switch 152 is in the numeric position. Nor circuit 130 will deliver a 0 logic level signal to nor circuit 124 any time switch 134 is closed, the counting circuit counts 0 and switch 152 is in the numeric position.

Switches 132 and 134 which are mechanically connected cooperate then to produce a binary coded 4 output from the translator on a 0 count of the counting circuit when switch 152 is in the alpha numeric position and to produce a binary coded 5 output from the translator when switch 152 is in the numeric position. A binary coded 4 on a 0 count indicates to the utilizing device 17 that an alpha numeric code is being used in the translator and letters are desired as an output from the utilizing device as previously stated. A binary coded 5 on a 0 count indicates to the utilizing device that a numeric code is being used and numbers are desired in the output therefrom. As with switch 132, if switch 134 is open no output signal from the translator will be recorded on a 0 count by the utilization device.

Control circuit 16 comprises nor circuits 55, 150, 151, 174, 176, 178, 180, 182, 184, 186, 188, 190, 192, 192*a* and 194, or circuits 196, 198, 200 and 202, switches 152, 204, 206, 208 and 210 connected as shown. The control circuit may be broken down for discussion purposes into a mode of operation selection and reset circuit including or circuit 196 and nor circuits 174, 150, 151, 190, 192, 192*a* and 194 and switch 152, a did operate circuit including nor circuits 192, 192*a* and 194, a clear circuit including or circuits 198 and 202 and nor circuits 176 and 55 and switch 210; a close circuit including or circuits 198 and 200 and nor circuits 176 and 178 and switch 208; a punch actuating circuit including nor circuits 180, 182 and 184; an error circuit including nor circuits 186 and 188; and an indicator circuit including switches 204 and 206 and indicator lights 212 and 214.

The mode of operation selection and reset circuit is provided to allow selection of either numeric or alpha numeric operation of the translator, to reset the input multivibrators after each did operate signal from the utilization device when switch 152 is in the numeric position, to reset the input multivibrators 20, 22, 24, 26, 28 and 30 on every odd count of the counting circuit 12 when switch 152 is in the alpha numeric position, to reset input multivibrator 18 on each count of the counting circuit in both alpha numeric and numeric operation, and as previously described to allow nor circuits 128, 116 and 122 to produce a 0 logic level output on even counts of the counting circuit with switch 152 in the alpha numeric position, to allow nor circuits 108, 112, 120 and 126 to produce a 0 logic level output only on odd counts of counting circuits 12 when switch 152 is in the alpha numeric position, to allow nor circuits 108, 112, 120 and 126 to produce 0 logic level output on both odd and even counts of the counting circuits with switch 152 in the numeric position, and to provide a 1 logic level input signal on conductor 272 to nor circuit 182 on even counts of the counting circuit with switch 152 in the numeric position and on all counts with switch 152 in the alpha numeric position. With switch 152 in the numeric position nor circuits 128, 116 and 122 are prohibited from ever having a 0 logic level output. Nor circuits 130 and 108 may have a 0 logic level output only when switch 152 is in the numeric position.

For a detailed explanation of the above recited functions assume first that mode selector switch 152 is in the up or alpha numeric position. In this position a 1 logic level signal from a regulated voltage source (not shown) which is present on voltage input conductor 216 is applied to or circuit 196 which has the property of presenting a 1 logic level output whenever any input thereto is at a 1 logic level and presenting a 0 logic level output only when all of the inputs thereto are at a 0 logic level. Such basic or circuits are well known in the art and will not therefore be considered in detail herein.

In the alpha numeric position of selector switch 152 therefore a 1 logic level signal from input conductor 216 is present on output conductor 222 of or circuit 196. Furthermore, since nor circuit 174 is only a logic level inverter such as nor circuit 46 a 0 logic level signal will appear on output conductor 224 thereof with switch 152 in the alpha numeric position.

In the alpha numeric mode of operation therefore a 1 logic level signal is fed over conductor 222 to conductor 226 to the input of nor circuit 190. Nor circuit 190 will in the manner of the other nor circuits therefore produce a logical 1 level output in the alpha numeric mode of operation only when a 0 logic level signal is received from counting circuit multivibrator 38 over input conductor 128 which will be only on odd counts of the counting circuit.

Nor circuits 192 and 192*a* will have a 0 logic level signal output when the input thereto from the circuit 190 and did operate conductor 229 from the utilization device as inverted in nor circuit 194 are at the 1 logic level. Nor circuit 194 is provided in conductor 228 to invert the 0 logic level signal received from the utilization device as a did operate signal to the 1 logic level signal necessary to cause nor circuits 192 and 192*a* to produce a 0 logic level output signal necessary to reset the input multivibrators. A 0 logic level output from nor circuit 192 on conductors 230, 232 and 234 and from nor circuit 192*a* on conductors 236, 238, 240 and 241 to parts $\overline{C}$, $\overline{F}$, $\overline{8}$, $\overline{4}$, $\overline{2}$, $\overline{1}$ and $\overline{K}$ of input multivibrators 30, 28, 26, 24, 22, 20 and 18 will cause the multivibrators to be reset to their state of operation wherein a logical 0 signal appears at the output of parts C, F, 8, 4, 2, 1 and $\overline{K}$ thereof.

A did operate signal at the 0 logic level will appear on conductor 228 from the utilization device each time the utilization device utilizes information from the circuit 14. The counting circuit counts, as will later be seen, each time utilization occurs. Therefore, since the input to nor circuits 192 and 192*a* from line 228 as inverted in nor circuit 194 is at the logical 1 level at every count of the counting circuit and as previously explained the output of the nor circuit 190 is at the logical 1 level in the alpha numeric position of switch 152 only on odd counts of the counting circuits, the multivibrators 20, 22, 24, 26, 28 and 30 will be reset as explained only on odd counts of the counting circuits at this time.

When switch 152 is in the lower or numeric position a 0 logic level signal from a regulated voltage source (not shown) over conductor 217 will always be present on conductor 222 from or circuit 196 and over conductor 226 at the input to nor gate 190. Therefore in the numeric position of switch 152 the input multivibrators will be reset on reception of every did operate signal from the utilization device which will be on every count of the counting circuit.

Conductor 58 of the did operate circuit as previously indicated feeds a logical 1 level signal to counting multivibrator 38 each time the utilization device makes use of an output signal from the output circuit thereby causing the counting circuit to count the number of such utilizations in a recurrent series of 13 counts. Conductor 32 of the did operate circuit serves to feed a 0 logic level reset voltage to input multivibrator 18 after every utilization of a translator signal by the utilization device and thereby resets the outputs of sides $\overline{K}$ and K of multivibrator 18 to 1 and 0 logic levels respectively after each said utilization if resetting thereof is necessary.

Resistors 33 and 195 are placed in conductors 32 and 228 as shown to provide the 0 logic level voltage in the did operate circuit from utilizing device 17.

With selector switch 152 in the alpha numeric position and therefore a 1 logic level signal on conductor 222 a 1 logic level signal will also be present on conductor 244 and conductors 159, 167 and 250 of nor circuits 128, 116 and 122 in the output circuit. Thus in the alpha numeric position of switch 152 a 0 level output from nor circuits 128, 116 and 122 is possible on even counts of the counting circuits as previously explained.

If switch 152 is in the numeric position placing a 0 logic level output at the input to nor circuits 128, 116 and 122 on conductors 159, 167 and 250 no 0 logic level output from these nor circuits is possible as previously indicated.

With selector switch 152 in the alpha numeric position a 0 logic level output will be present on conductor 224 on all counts of the counting circuit due to the inversion of the 1 logic level output of or circuit 196 by nor circuit 174. The 0 logic level signal from conductor 224 is fed to the input of nor gate 150 and therefore causes a logic level of 1 at the output thereof on conductor 272. A logic level of 1 at the input of nor circuits 182 on conductor 272 will allow a 0 logic level output therefrom on all counts of the counting circuit 12 when the outputs from nor gates 180 and 176 are also at the 1 logic level as will later be considered in connection with the utilizing device actuating circuit.

If selector switch 152 is in the numeric position the logic level of the signal on the conductor 224 will be 1 and therefore the output from nor circuit 150 will be at a 1 logic level only on even counts of the counting circuit and when close switch 208 is in the up position as will later be explained. Therefore a 0 logic level output from nor circuits 182 is possible only on even counts of the counting circuit and on a close operation when selector switch 152 is in the numeric position.

It will also be noted that the signal on conductor 224 which is fed to nor circuit 150 is also fed to nor circuits 108 and 130. As just explained this signal will be at a 1 logic level with switch 152 in the numeric position and a 0 logic level with switch 152 in the alpha numeric position allowing a 0 logic level signal output from nor circuits 108 and on 130 only in the numeric position of switch 152. The 0 logic level output from nor circuit 130 produces a 1 logic level output from nor circuit 124 on a 0 count of the counting circuit in conjunction with the output of nor circuit 48 to indicate to the utilization device the mode of operation of the translator as previously explained when switch 134 is closed. If switch 134 is open on a 0 count of the counting circuit no output signal will be recorded by utilization device 17.

With switch 152 in the alpha numeric position as previously explained a 1 logic level signal will be present over conductors 222, 226 and 227 at the input to nor circuit 151. As before if switch 152 is in the numeric position a 0 logic level signal will be present at the input to nor circuit 151. These inputs combine with the input to nor circuit 151 on conductor 153 from side ① of multivibrator 38 as inverted in nor circuit 46*a* to provide an output from nor circuit 151 at a 1 logic level on odd counts of the counting circuit with the switch 152 in the alpha numeric position and on all counts of the counting circuit when switch 152 is in the numeric position. This output fed to nor circuits 112, 120 and 126 over conductor 252 in conjunction with conductors 164, 170 and 256 will allow these nor circuits to produce a 0 logic level output and therefore a 1 logic level output on conductors 115, 119 and 125 only on odd counts of the counting circuit with switch 152 in the alpha numeric position and on all counts with switch 152 in the numeric position providing the other input signals to the nor circuits 112, 120 and 126 are also a 1 logic level as will later be seen.

The total effect of the positioning of selector switch 152 in conjunction with the reset and did operate circuits is then in the alpha numeric position to cause the input multivibrators to be reset on every odd count of the counting circuit, to allow a 0 logic level output from the nor circuits 128, 116 and 122 on even counts of the counting circuit, to allow nor circuits 112, 120 and 126 to have a 0 logic level output on odd counts of the counting circuit, to allow nor circuit 182 to have a 0 logic level output on all counts providing a 1 logic input thereto is present on conductors 270 and 274, and to prevent a 0 logic level output from nor circuits 108 and 130.

No 1 logic level output on output conductors 115, 119 and 125 is possible due to 0 logic level signals from nor circuits 128, 116 and 122 respectively with selector switch 152 in the numeric position due to the 0 logic level input to the respective nor circuits. Nor circuits 108, 112, 120 and 126 may however cause output signals on output conductors 111, 115, 119 and 125 on all counts of the counting circuit 12 when selector switch 152 is in the numeric position.

The clear circuit is caused to operate by switching switch 210 which may be positioned on a control panel (not shown) from its usual position as shown wherein a 0 logic level signal is delivered to or circuits 198 and 202 from conductor 217 to a position wherein a 1 logic level is delivered thereto from conductor 216. A 1 logic level input to or circuit 202 over conductor 203 will produce a 1 logic level output therefrom which will cause nor circuit 55 to have an input at the 1 logic level and therefore a 0 logic level output. The 0 logic level output of nor circuit 55 on conductors 207 and 209 is used to reset each of the counting circuit multivibrators as by the application of the 0 logic output existing on conductor 207 to the multivibrator 45 and the input multivibrators in the manner previously described to produce a 1 logic level output from sides $\overline{K}$, $\overline{1}$, $\overline{2}$, $\overline{4}$, $\overline{8}$, $\overline{F}$, $\overline{C}$, thereof which places the translator in starting condition for a cycle of operation after the 0 logic output of nor circuit 48 is applied to the Ⓡ side of multivibrator 45. The 1 logic level input to or circuit 198 will produce a 1 logic level output therefrom and input to nor circuit 176 providing a 0 logic level output therefrom on 0 counts of the counter when the signal on conductor 82 is also at a 1 logic level. On other counts of the counting circuit the output of nor circuit 176 is at a logic level of 1 permitting operation of nor circuit 182 so as to permit operation of the utilization device in response to a clear signal except on a 0 count. Switch 210 is always switched to the 1 logic level position at the start of operation of the translator to correctly set the translator for a cycle of operation and automatically returns to the 0 logic level position shown on being released.

Similarly the close circuit is activated by switching switch 208 which may also be located on the aforementioned control panel in an up or close position. Switch 208 while in the close position will cause a 1 logic level signal from conductor 216 to be fed to or circuits 198 and 200 instead of the usual 0 logic level signal fed thereto when switch 208 is in the down position as shown. As with the clear circuit when a 1 logic level signal is fed to or circuit 198 it will produce a 1 logic level output signal therefrom and therefore provide a 1 logic level input to nor circuit 176 which will provide an output therefrom at a 0 logic level only on a 0 count of the counting circuit 12. The output from nor circuit 176 will prevent operation of the utilization device therefore only on a 0 count of the counting circuit with the close or clear switch in the close or clear position.

A 1 logic level signal fed to or circuit 200 will produce a 0 output signal level from nor circuit 178 to nor circuits 180 and 150 over conductors 191 and 197 which will produce a 1 logic level output from these nor circuits which will produce a 1 logic level output on output conductors 189 and 185 when switch 208 is pressed which may be used to cause the utilizing device to become insensitive to any further signals delivered thereto by the translator as will later be explained. A close signal due to moving switch 208 into the up position therefore allows automatic completion of the word frame with a binary digit of 0 being recorded by the utilizing device as will later be shown.

It will be noted that or circuits 200 and 202 have input conductors 260 and 262 connected thereto respectively and that or circuit 198 has both input conductors 260 and 262 connected thereto. Input conductors 260 and 262 are provided to allow clear or close signals to be sent to the translator from remote locations should this be desirable.

If it be assumed that the utilizing device 17 represents a tape punching mechanism, then it will be noted that a 1 logic level output signal from nor circuit 184 will cause the tape punching mechanism to punch a tape in accordance with the output signals present on output conductors 105, 107, 111, 115, 119 and 125. Operation of the punch actuates a switching device which sends back a did operate signal over conductor 228 to the translator which is utilized as previously described. As before a 0 logical level signal on either input 264 or 34 to nor circuit 184 will produce the 1 logic level output required to actuate the punch.

A 0 logic level signal will be present on input conductor 34 any time the last input signal to multivibrator 18 in the input circuit 10 has been from conductor 19 to side K thereof. The input to nor circuit 184 on conductor 264 will be 0 logic level when the input to nor circuit 182 over each of conductors 270, 272 and 274 is at the 1 logic level. As explained in connection with the clear and close circuits the signal on conductor 274 from nor circuit 176 will be at a 1 logic level except when the clear or close switch 208 or 210 are closed and the counter counts 0 or a remote clear or close signal is present from conductor 260 or 262. The signal on conductor 272 will be at the 1 logic level at all times in the alpha numeric position of switch 152 due to a 0 logic level input to nor circuit 150 and will be at the 1 logic level on even counts of the counting circuit in the numeric position of switch 152 and when a close signal is present as explained in consideration of nor circuit 150. The signal applied to nor circuit 182 over conductor 270 will be at the 1 logic level any time any input to nor circuit 180 over conductors 276, 278 or 280 is at the 0 logic level. The signal on conductor 276 will be at a 0 logic level only on a count of 12 by the counting circuit as previously explained. The signal on conductor 278 will be at 0 logic level only on a count of 0 by the counting circuit also as previously explained. A 0 logic level signal will also appear on conductor 280 on odd counts of the counting circuit as previously explained.

In summary therefore it is possible to have a 0 logic level signal output from nor circuit 182 on 12 and odd counts of the counting circuit and on a 0 count thereof when the close and clear circuits are not pressed and switch 152 is in the alpha numeric position. In the numeric position of switch 152 the output of nor circuit 182 will be a 0 logic level only on 12 counts of the counting circuit and on 0 counts when no close or clear signals are present. Therefore it should be evident that if a new input signal is felt on conductor 19 on each even count of the counting circuit that the punch would operate twice for each signal input with the selector switch 152 in the alpha numeric position. Under the same circumstances with the selector switch 152 in the numeric position the punch will operate after each input signal and on 12 and most 0 counts, however in the numeric mode of operation an input signal is received after each count of the counting circuit except 12, and 0 with a positive number input as will later be evident.

A 1 logic level output from nor circuit 188 to output conductor 189 serves to light a warning light (not shown) and lock the keyboard of the input device 15 which feeds signals into the translator. Additionally, the utilizing device may be made inoperative in the same manner. Nor circuit 188 serves as a logic level inverter such as nor circuit 46 and produces a 1 logic level output from a 0 logic level out of nor circuit 186 or nor circuit 176. Nor circuit 186 produces a 0 logic level output any time the inputs thereto on conductors 282, 284 and 36 are all at the 1 logic level. The signal on conductor 282 will be at the 1 logic level on the 0, 12 and odd counts of counting circuit 12 as explained in connection with the output of nor circuit 180. Likewise, as explained in connection with the output of nor circuit 150 the signal on conductor 284 will be at the 1 logic level at all times with switch 152 in the alpha numeric position and on even counts of the counter when switch 152 is in the numeric position and when a close signal is present. The signal on input conductor 36 to nor circuit 186 will be at the logical 1 level at all times after the last input to input multivibrator 18 has been from input conductor 19. It should be evident therefore that the only time a 1 logic level output will be present on output conductor 189 with switch 152 in the alpha numeric position is on 0, 12 and odd counts of the counting circuit if during these positions of the word frame an input to multivibrator 18 has been on the K side thereof. Also, whenever the close selection is made a 1 logic level output on conductor 185 exists until a 0 logic level from nor circuit 176 is applied to conductors 274 and 193 and thereby causes simultaneously an output signal of a 1 logic level on conductor 189 to appear and the output on conductor 185 to become a 0 logic level again; this of course happens in the zero count of the counting circuit 12. With switch 152 in the numeric position a 1 logic level output will be automatically present on output conductor 185 on 0 and 12 counts of the counting circuit, or with switch 208 in the close position as before, or if an input is felt on side K of the multivibrator 18.

Indicator lights 212 and 214 and switches 204 and 206 respectively connected mechanically to switches 152 and 134 respectively are provided as shown connected across conductors 213 and 215 in such a manner that light 214 will be lit when switch 134 is closed and light 212 will be lit when switch 152 is in the numeric position. Conductors 213 and 215 are connected respectively to a 0 volt and negative 20 volt unregulated voltage sources (not shown). Lights 212 and 214 may be located on the previously mentioned control panel if desired along with switches 132, 134, 152, 208 and 210.

Having thus described the individual circuits and their individual operation the over-all operation of the embodiment of the invention shown in the figures will now be considered in connection with a specific example of code translation by the translator.

In accordance with the invention in the alpha numeric mode of operation an input signal consisting of a binary coded group of input signals and a key signal is fed from the input device 15 over conductors 19, 21, 23, 25, 27, 29 and 31 to the input multivibrators of the translator 11. The key signal indicates to the translator that a key on the input device has been pressed and that a coded number or letter is available on the other input conductors of the translator. The key signal is placed in the translator on conductor 19. A binary coded input is received by the multivibrators 20, 22, 24, 26, 28 and 30. The translator upon receiving this input causes an output on conductors 105, 107, 111, 115, 119 and 125 which is a two character representation of what would normally be a single character. The binary coded input signal may indicate a single numeral or letter. For example in a particular code the letter "f" may be coded a single character binary 53 which would be comprised of a binary 1, 4, 16 and 32. On striking the letter "f" therefore on an input device such as a typewriter using such a code, a key signal would appear on input conductor 19 which would indicate to the translator that a key is depressed. Additionally, at this same time, the above code is presented to the input conductors 21, 23, 25, 27, 29 and 31 in the following manner. For example, the binary 4 on conductor 25, the binary 16 on conductor 29 and the binary 32 on conductor 31.

The translator according to its logic levels previously described translates this single character into two separate characters by first presenting the signals existing on conductors 27, 29 and 31 to the output conductors 125, 119 and 115 and then after receiving a did operate signal from the utilizing device, such as a punch mechanism, apply the input signals existing on conductors 25, 23 and 21 again to output conductors 115, 119 and 125. This, in the present example would be achieved by first causing the binary 32 existing on conductor 31 to be transmitted to conductor 115 by means of conductors 156 and 158. The binary 16 existing on conductor 29 would cause an output signal on conductor 119 by means of conductors 168 and nor circuit 116. Since there is no binary signal on input conductor 27, none would be transmitted to output conductor 125. As soon as the utilizing device uses the signals a did operate signal is caused on conductor 228 which results in the counting circuit 12 to count one position more in the word frame to an even number. At this time, the logic levels become so as to permit the signals placed on conductors 25, 23 and 21 to be directed to the output conductors 115, 119 and 125. Again, since no binary 2 existed on conductor 23, none will be transmitted to output conductor 119.

Upon the utilization of these signals, a two character output is caused in the utilizing device which is a binary 6 and a binary 5. However, in the alpha numeric mode, these two characters are treated by the utilizing device as being a single digit of 65 which represents the original signal of a binary 53. Of course, as previously mentioned, a clock signal on output conductor 105 would be present each time information signals are present on conductors 115, 119 and 125. Additionally, a signal would appear on conductor 185 to indicate a required progression or indexing of the tape to the utilizing device.

The desired output from the translator of the invention with such an input and operating in the alpha numeric mode is, a first output comprising a clock signal on output conductor 105, a binary coded 6 on output conductors 125, 119 and 115 and a punch operate signal on output conductor 185, and upon completion of the did operate signal a second output comprising a clock signal on output conductor 105, a binary coded 5 on output conductors 125, 119 and 115 and a punch operate signal on output conductor 185.

As previously mentioned translation of simultaneously received two digit binary coded numbers and a key signal, into an input signal for a utilization device consisting of a first signal including a clock pulse, a first of the two binary coded digits and a punch operate signal and a second signal including a clock pulse, a second of the two binary coded digits and a punch operate signal was previously a laborious manual operation. The translator of the invention makes such translation and in addition groups the output signals into computer words of 10 signals each, signals the end of each word, and provides two signals before the start of each word for the transmission of mode of operation, sign, and other instructions to the utilizing device.

Specifically, suppose it is desired to translate the imaginary word "q3fd+1" from the output of input device 15 as above indicated into an input as described above for utilizing device 17. The alpha numeric coded word q3fd+1 in the particular binary code of the output signal of the input device is q=63, 3=35, f=53, d=16, +=20 and 1=33. The same word in the output code of the translator will be q=77, 3=43, f=65 as above, d=20, +=24, and 1=41.

Before striking any keys on the input device the operator of the system consisting of the input device 15, the translator of the invention 11 and utilizing device 17 connected in series in that order as shown in FIGURE 2 must first of course energize the system by turning on a power switch (not shown) which supplies the required operating voltages to the system. Switches 132 and 134 are closed, and since the example under consideration is an alpha numeric word, the switch 152 is then placed in the alpha numeric position which is up on the diagram of FIGURE 1-C. The operator then actuates the clear switch 210 or a remote clear signal is caused to be sent to translator 11 to cause each of the input multivibrators and the counting multivibrators to operate in the manner previously described wherein a 1 logic level signal output is provided from sides $\overline{K}$, $\overline{1}$, $\overline{2}$, $\overline{4}$, $\overline{8}$, $\overline{F}$, $\overline{C}$, $\overline{①}$, $\overline{②}$, $\overline{④}$, $\overline{⑧}$ and $\overline{Ⓡ}$ thereof.

With the translator so activated the nor circuit 180 will have a 1 logic level output to nor circuit 182 due to the 0 logic level input to nor circuit 180 over conductor 278 on a 0 count of the counting circuit. The input to nor circuit 182 over conductor 272 will also be a 1 logic level at this time due to the switch 152 being in the alpha numeric position producing a 0 logic level input to nor circuit 150 over conductor 224. Also, the input to nor circuit 182 over conductor 274 is at a 1 logic level at this time since no clear or close 1 logic level signals are present in or circuit 198 and the input to nor circuit 176 from or circuit 198 is therefore at a 0 logic level. Therefore, since all the inputs to nor circuit 182 are at a 1 logic the output therefrom to nor circuit 184 will be at a 0 logic level causing nor circuit 184 to deliver a 1 logic level signal output to the utilization device over output conductor 185. The 1 logic level output to the utilization device over conductor 185 is used to cause a punch (not shown) or other recording device to record 1 logic level signal wherever they may appear on output conductors 105, 107, 111, 115, 119, and 125 as previously indicated.

Since no key has yet been struck on the input device the only output conductor to have a 1 logic level signal thereon at this time is then conductor 115 due to switch 132 being closed and a 0 logic level output over conductor 136 to nor circuit 114 on the 0 count of the counting circuit. On the 0 count of the counting circuit a 1 logic level output from conductor 115 which represents a binary coded 4 indicates to the utilizing device alpha numeric operation of the translator as previously explained.

The above indicated operation of the recording punch in the utilization device through actuation of a limit switch or other means produces a did operate signal at a 0 logic level which is fed back to the translator over conductor 228 as previously described. The signal received over conductor 228 is fed to nor circuit 194 in the control circuit and by means of conductors 229, 32 and 58 to nor circuit 192 and 192*a*, input circuit multivibrator 18 and counting circuit multivibrator 38 respectively. Since the input multivibrators are operating with a 1 logic level output from sides $\overline{K}$, $\overline{1}$, $\overline{2}$, $\overline{4}$, $\overline{8}$, $\overline{F}$ and $\overline{C}$ already due to the clear signal previously applied thereto the signals applied over conductors 228, 229 and 32 to nor circuits 194, 192 and 192*a* and to multivibrator 18 will have no effect on a 0 count of the counting circuit. The signal applied over conductor 58 to multivibrator 38 will however cause the counting circuit to count 1 in the manner previously described.

On the 1 count the input to nor circuit 180 will be 0 over input conductor 280 and in the manner indicated on the 0 count of the counting circuit all inputs to nor circuit 182 will therefore be at the 1 logic level causing the punch or the utilization device to operate to record the signals which may be present on the output conductors at this time. The signals on the output conductors when the counting circuit counts 1 are at a 0 logic level for output conductors 107, 111, 115, 119, 125 and 189 since no keys have yet been struck on the input device. The output from output conductor 105 will be at a 1 logic level however due to the 1 logic level inputs to nor circuit 102 from nor circuits 48, 52 and 184 on the 1 count of counting circuit 12.

The 1 level output of nor circuit 104 serves as a clock signal to indicate continuously to the utilization device that the information it is receiving is information instead of instruction. The 0 logic level outputs from the nor circuits 110, 114, 118 and 124 indicates to the utilizing device on a 1 count of the counting circuits that the following coded computer word of ten characters is a positive rather than a negative word. All words in the alpha numeric mode of operation are positive and the output from conductors 111, 115, 119 and 125 with switch 152 in the alpha numeric position on a 1 count will always be at the 0 logic level.

The operation of the punch in the utilizing device on a 1 count of the counting circuit to record the clock signal signifying a positive computer word is to follow as before also sends back a did operate signal to the translator which is effective only to cause the counting circuit to count 2 as none of the input multivibrators needs resetting at this time.

The operator then strikes the "q" key on the input device keyboard and in accordance with the input device code a signal appears on input conductors 19, 21, 23, 25, 27, 29 and 31. The signal on 19 indicating to the translator that a key has been struck on the input device. The signals on input conductors 21, 23, 25, 27, 29 and 31 indicating a binary coded 63 from the input device which in the output of the translator will be a pair of time spaced binary coded 7's.

These input signals applied to sides K, 1, 2, 4, 8, F and C of the input multivibrators cause the multivibrators to change their state of operation so that a 1 logic level signal is produced from said sides. The 1 logic level signal produced from sides 1, 2, 4, 8, F and C of the input multivibrators is immediately present on conductors 288, 172, 162, 290, 168 and 158 to output circuit 14 nor circuits 126, 120, 112, 122, 116 and 128. The 1 logic level signal produced by multivibrator 18 from side K thereof is present at the input to nor circuit 186, however no 1 logic level output appears on output conductor 189 at this time due to the 0 logic level output from nor circuit 180 on a 2 count of the counting circuit.

A 1 logic level signal output does appear on output conductors 115, 119 and 125 on the 2 count of the counting circuits however due to the 0 logic level input to nor circuits 114, 118 and 124 from nor circuits 128, 116 and 122 respectively. As previously indicated nor circuits 128, 116 and 122 produce 0 logic level outputs during the two count due to the 1 logic level inputs thereto over conductors 159, 167 and 250 respectively with switch 152 in the alpha numeric position and the 1 logic level inputs thereto over conductors 160, 166 and 292 respectively from the counting circuit on even counts thereof in conjunction with the 1 logic level inputs thereto from input multivibrators 30, 28 and 26 over conductors 158, 168 and 290 respectively due to the binary coded 63 input to the input multivibrators.

On the two count of the counting circuit the 1 logic level output signals on conductors 115, 119 and 125 due to the above indicated first binary coded 63 is caused to be recorded in the utilization device as a binary coded 7 by a 1 logic level output signal appearing on output conductor 185 on a two count of the counting circuit which actuates the recording mechanism in the utilizing device 17. As previously indicated a 1 logic level signal appears on output conductor 185 on a two count of the counting circuit due to the 0 logic level fed to nor circuit 184 over conductor 34 after the appearance of a signal on conductor 19 due to the striking of the "q" key on the input device 15.

The recording of the first binary 7 by the utilization device causes a signal to be sent back therefrom over conductor 228 which causes the counting circuit to count 3 and resets input multivibrator 18 so that a 1 logic level output is obtained from side $\overline{K}$ thereof. The three count from counting circuit 14 being an odd number count produces a 1 logic level output from nor circuit 190 which on reception of the next did operate signal over conductor 228 will produce a 0 logic level output from nor circuit 192 to reset the input multivibrators as previously explained.

The second binary coded 7 in the number 77 which is an alpha numeric coded "q" in the output code of the translator is caused to be recorded by the utilization device on the three count of the translator. The second binary coded 7 appears as 1 logic level output signals on conductors 115, 119 and 125 on a 3 count of the counting circuit due to the 1 logic level inputs to nor circuits 112, 120 and 126 over conductors 164, 170 and 256 on odd counts of the counting circuit as previously explained and the 1 logic level signal inputs thereto due to the signals appearing on input conductors 25, 23 and 21.

The 1 logic level signals appearing on output conductors 115, 119 and 125 indicating a binary coded 7 are caused to be recorded by the utilization device on a three count due to the 1 logic level output from the nor circuit 184 caused by the 1 level inputs to nor circuit 182 over input conductors 270, 272 and 274 on odd counts of the counting circuit with no close or clear signal present as previously explained.

The recording of the second binary coded 7 in the number 77 by the utilizing device 17 produces a did operate signal which is fed back to the translator 10 over input conductor 228 to nor circuit 192 thereby producing a 0 logic level signal causing the input multivibrators to be reset as previously explained to produce 0 logic level signals from sides 1, 2, 4, 8, F, C and K thereof. The did operate signal from the utilization device also causes the counting circuit to count 4 after which a second key "3" may be punched on the input device.

It will be understood that a 1 logic level clock signal from output conductor 105 has been recorded along with both 7's on counts 2 and 3 of the counting circuit and will be recorded on all counts thereof except the 0 and 12 counts as previously explained. This clock pulse indicates to the utilization device that the translator is operating even though a binary coded 0 signal may be present on output conductors 111, 115, 119 and 125 of the translator.

It will also be seen that should a second key "3" be struck on the keyboard of the input device before the second 7 in the alpha numeric coded "q" has been recorded by the utilization device that the counting circuit will still be on an odd or 3 count at such time. A key strike on a three count of the counting circuit would cause all the inputs to nor circuit 186 to be at a 1 logic level which as previously explained will produce a 1 logic level output on conductor 189 which may be used to lock the keyboard of the input device preventing further input to the translator and to light a warning light indicating that information is being received by the translator faster than it can be translated thereby.

Thus it can be seen that input information comprising a two digit binary coded number and a key signal placed on input conductors 19, 21, 23, 25, 27, 29 and 31 by striking a key on an input device is translated into two time spaced output signals each containing one binary coded signal, a clock pulse and a punch operate signal. It can also be seen that the error circuit will not operate in the alpha numeric mode of translator operation unless a close signal is present or the information is fed to the translator too fast.

In the manner just described the first five letters of the alpha numeric word q3fd+1 may be translated and recorded by the utilization device as binary coded numbers 7743652024 which would appear on a tape or other recording device in that order. After recording the 4 which will be the last binary coded number to be recorded from the alpha numeric coded + sign the utilizing device will as before send back a did operate signal to the translator at which time the translator will count 12 and reset all the input multivibrators.

As previously indicated on a 12 count a 1 logic level output signal appears on output conductor 107 from nor circuit 52. Also a one output is produced from output nor circuit 180 as previously indicated which in conjunction with the other inputs to nor circuit 182 on a 12 count of the counting circuit with no clear or close signal present causes a punch operating 1 logic level signal to appear on output conductor 185. Furthermore all the signal inputs to nor circuit 186 would be at the 1 logic level on a 12 count of the counting circuit if a signal from the input device were received at this time which would lock the keyboard of the input device and as previously explained no clock pulse will be produced during a 12 count of the counting circuit. Therefore on a 12 count the output of the translator as previously indicated will be a finish signal on conductor 107 which when recorded by the utilization device indicates thereto the end of a computer word.

On recording of the finish signal as before a did operate signal is sent back to the translator and the translator is caused to count 13 or 0 count at which time the counting multivibrators are reset to 0 by putting a 0 logic level input to side Ⓡ of multivibrator 45 over conductor 93 from nor circuit 54. On the resetting of the multivibrators to 0 on the thirteenth count an output of 0 logic level is produced from nor circuit 48 as before which is applied to side Ⓡ of multivibrator 45 over conductor 81 ot reset the multivibrator to await the next twelve count or a clear signal.

Again it will be noted that due to the inputs to nor circuit 186 the keyboard of the input device will be locked with the counter in the 0 position on the thirteenth count if an input signal is fed to the translator at this time. The mode of operation signal on the 0 count and the sign signal on the 1 count will again be automatically recorded as previously explained. On the 2 and 3 count of the new computer word the alpha numeric coded 1 will be recorded by the utilizing device as a binary coded 4 and 1 and the counter will be caused to count 4 resetting the input multivibrators so that only 0 logic level signals are fed therefrom to the output circuit nor circuits.

The computer word may then be completed by pressing the close switch 208 thereby providing a 1 logic level input to nor circuit 178 which applies a 0 logic level signal to nor gate 180 so that the output of nor gate 180 is always 1 with the close switch in an up position in FIGURE 1–A. Also in the alpha numeric position of switch 152 the signal on input conductor 272 to nor circuit 182 is always 1. The same is true of the signal input on conductor 274 except on a 0 count of the counting circuit with a close or clear signal present. Therefore in the alpha numeric mode of operation with the close switch in an up position the punch in the utilization device will be caused to operate and the translator will count and send binary coded 0 signals to the utilization device in addition to the clock signals to complete a binary coded word. The automatic counting will cease on the completion of a computer word with the translator multivibrators reset to receive an input signal and the counting circuit on a 0 count. It will be noted that the input device has been locked by a 0 level signal on conductor 193 to nor circuit 188 during the close operation.

The complete operation of the translator in the alpha numeric mode of operation has now been considered. The operation of the translator in the numeric mode is similar to that in the alpha numeric mode and will now be discussed in detail.

The input to the translator 10 in the numeric mode of operation comprises a key signal and signals representing binary coded numbers from 1 through 9 and including 0. The binary coded number may be placed in the translator 10 on input conductors 21, 23, 25 and 29. The key signal is as before placed in the translator from the input device on input conductor 19. The identical binary coded number may be delivered to a utilization device from output conductors 125, 119, 115 and 111. The output of the translator 10 in the numeric mode of operation also includes a clock pulse from output conductor 105 on all counts of the counting circuit except the 12 and 0 counts and a punch operate signal from output connector 185 as before.

In the numeric mode of operation if a key representing a particular number is struck on the input device keyboard that number will appear on the input conductors of the translator in binary form. For example if a 9 key is struck the signal input to the translator will be on conductors 21 and 27 with a key signal on conductor 19 and a clock signal on conductor 31. The output from the translator 10 representing the same 9 signal in the numeric mode of operation on the same count of the counting circuit will be a single simultaneous output on conductors 111 and 125 with a clock pulse from conductor 105 and a punch operate signal from conductor 185.

In the numeric mode of operation the translator serves to group the binary coded number input thereto into computer words, to indicate the finish of the computer word and to provide sign and mode of operation information to the utilizing device in a manner similar to that in which it performs these functions in the alpha numeric mode of operation. There are however 10 coded information input signals for 10 coded information output signals in a thirteen count cycle for a 13 frame computer word in the numeric mode of operation in contrast to five input signals for 10 output signals in the alpha numeric mode of operation. The input multivibrators are therefore reset after each did operate signal from the utilization device in the numeric mode of operation.

Considering a specific example then, assume it is desired to translate the number −987 from binary coded input signals each with a key pulse into the same binary coded signals as an output each with a clock signal and a punch operate signal and to group the output signals into computer words complete with the sign of the number and to mark the end of a computer word and indicate to a utilizing device that the translator is operating in the numeric mode of operation.

The switch 152 is first placed in the numeric or down position and as before switches 132 and 134 are closed. Next the input and counting multivibrators are cleared as before through the use of switch 210. The counting multivibrators now indicate a 0 count and as before a 1 logic level output appears on output conductor 115 over conductor 136 from nor circuit 48. A 1 logic level output signal also appears on conductor 125 due to the 1 logic level inputs to nor circuit 130 on conductor 300 from nor circuit 50 on a 0 count and the 1 logic level input thereto on conductor 298 due to switch 152 being in the numeric position. As previously indicated a 1 logic level on output conductors 115 and 125 indicate a binary coded 5 and operation of the translator in the numeric mode to the utilizing device on the 0 count of the counting circuit.

The punch actuate circuit is automatically energized on a 0 count of the counting circuit through nor circuits 184 and 182 due to each input to nor circuit 182 being at a 1 logic level on the 0 count of the counting circuit as previously indicated to produce a 1 logic level signal output on output conductor 185. As before the 1 logic level signal output on conductor 185 causes the signal on the output conductors 115 and 125 to be recorded by the utilizing device.

The utilizing device on recording the coded 5 signal sends back a did operate signal over conductor 228 as before which causes the counting circuit to count 1 by reversing the output signals from sides ① and $\overline{①}$ of multivibrator 38. The same did operate signal serves as before to reset input multivibrator 18 providing it needs resetting. Also, every did operate signal will serve to reset multivibrators 20, 22, 24, 26, 28 and 30 in the input circuit while the translator 10 is operating in the numeric mode since the output of nor circuit 190 is always a 1 logic level in the numeric mode of operation due to the 0 logic level input thereto over conductor 226 with switch 152 in the numeric position.

With the translator in the numeric mode of operation the punch operate circuit does not however become energized automatically on a 1 count of the counting circuit as it did in alpha numeric operation. This is because the sign of the number being translated is not always positive in numeric operation as it was with alpha numeric operation. The signal automatically recorded in the alpha numeric mode of operation indicated to the output device that a positive computer word was to follow. In numeric operation the operator of the input device must strike a key on the 1 count of the word to energize the punch actuate circuit by causing the output from multivibrator 18 over conductor 34 to nor circuit 184 to be a 0 logic level as previously explained. If the operator strikes a key for an odd number this signals the output device that the following number is negative. Similarly an even number key strike or no key strike indicates a positive signal will follow.

In this manner an operator by striking different odd or even keys on the one count of the counting circuit while operating the translator in the numeric mode may convey to the utilization device other instructions such as a carriage return instruction signified by the number 5 for example so that the output device will produce columns of 10 digit numbers rather than just a line of numbers as it would do without the added instruction.

On striking of the 5 key on the input device with the counter counting 1 input signal will appear on conductors 21 and 25 and on 19. The input signals appearing at the input of multivibrators 20 and 24 will as previously explained produce a 1 logic level signal on conductors 288 and 162 at the input to nor circuits 112 and 126 respectively. The input signals to nor circuits 112 and 126 on conductors 164 and 256 will also be at the 1 logic level during numeric operation due to the 0 logic level signal input to nor circuit 151 on conductor 227 with switch 152 in the numeric position. Therefore since all the input signals to both nor circuits 112 and 126 are at the 1 logic level at this time a 0 logic level will be produced therefrom as before producing a 1 logic level output signal on conductors 115 and 125.

The 1 logic level output signals on conductors 115 and 125 representing carriage return information and the negative sign in the example are caused to be utilized by the utilization device by a 1 logic level signal appearing on the output conductor 185 of the punch actuating circuit. In the manner previously described a 1 logic level signal on output conductor 185 is produced by the output signal from side $\overline{K}$ of multivibrator 18 on conductor 19.

On utilization of the signals from the output circuit as before the utilizing device sends back a signal over conductor 228 of the did operate circuit which causes the counting circuit to count 2 and the input multivibrators to be reset in the previously explained manner ready to receive another input signal.

In the example under consideration a 9 key is then actuated on the keyboard of the input device causing input signals to be present on input conductors 19, 21 and 27, which produce in the manner previously indicated output signals from the punch actuate circuit on conductor 185 and from the output circuit on conductors 111 and 125. The utilizing device also as before records the binary coded 9 signal present in the output circuit and sends back to the translator a did operate signal which causes the counting circuit to count again and the input multivibrators to be reset.

In a similar manner binary coded 8 and 7 numbers of the example may be received by the translator from the input device, translated by the translator on the 3, and 4 counts thereof and recorded by the utilizing device. The close switch 208 may then be pressed to complete the computer word with 0's along with the clock signals as before on counts 5, 6, 7, 8, 9, 10 and 11 and a finish signal on the twelfth count of the counting circuit. As before the close action of the close circuit is halted on the 0 count of a new cycle of operation by a 0 logic level output from nor circuit 176 on a 0 count of the counting circuit with the close switch closed. On release of the close switch the counter automatically counts 1 as before starting a new cycle of numeric operation.

With the translator operating in the numeric mode it will be appreciated that as in the alpha numeric mode of operation clock signals and a finish signal are present on output conductors 105 and 107 respectively on counts 1–11 and on a 12 count respectively and are recorded by the utilization device along with the other output information from the translator. As before the clock signal serves to indicate that the translator has functioned during the count on which it is recorded even though no other output therefrom is evidenced. The finish signal again marks the end of a computer word.

It will also be noted that an output from the error circuit on conductor 189 will be present with the translator operating in the numeric mode when the close switch 208 is in the up position due to a 0 logic level input to nor circuit 188 over conductor 193 at this time and on a 12 and a 0 count of the counting circuit due to the 0 logic level output of nor circuit 186 on these counts as previously explained should an input be received to the translator 11 on conductor 19 during these counts. The error signal as previously explained may be used to lock the keyboard of the input device or light a warning light to indicate that the translator is unable to receive an input signal during these times.

It will also be noted that in numeric operation of the translator that during counts 1 through 11 which are the counts on which input information is fed to the translator input circuit that output nor circuits 110, 115, 119 and 125 can receive 0 logic level input signals only from nor circuits 108, 112, 120 and 126. Nor circuits 128, 116 and 122 are prevented from having a 0 logic level output at this time due to the down or numeric position of switch 152 and the resultant 0 logic level input to the nor circuits on conductors 159, 167 and 250. Further it will be noted that with switch 152 in the numeric position that the output from nor circuit 151 will always be a 1 logic level whereby a 0 logic level output from nor circuits 108, 112, 120 and 126 will be obtained immediately on a signal input on input conductors 21, 23, 25 and 27 respectively.

Thus it can be seen that in the numeric mode of operation of the translator that signal inputs thereto pass immediately to th translator output conductors. This is in contrast to the alpha numeric operation of the translator wherein a single input to the translator is operative to produce signals on the output conductors thereof during two counts of the counting circuit alternately over nor circuit group 128, 116 and 122 and group 112, 120 and 126.

The drawings and the foregoing specification constitute a description of the logical translator of the invention in such full, clear, concise and exact terms as to enable any person skilled in the art to practice the invention, the scope of which is indicated by the appended claims.

What I claim as my invention is:

1. A logical translator for translating signals received from an input device into a form suitable for use in a utilizing device such as an electronic computer or the like, comprising means operable to receive groups of binary coded simultaneous signals and a key signal, second means operably associated with the first mentioned means and selectively continuously operable in either an alpha numeric or numeric mode to translate said signals into binary coded output signals each including a clock signal and a signal operable to cause the output signals of the translator to be recorded by the utilizing device, means operably associated with said second and first mentioned means to group said output signals into computer words, and closing means operable in conjunction with said second means to automatically complete a computer word when the translated coded information does not complete a computer word.

2. A logical translator for translating signals received from an input device into a form suitable for use in a utilizing device such as an electronic computer or the like, comprising means operable to receive groups of binary coded simultaneous signals and a key signal, second means operably associated with the first mentioned means and selectively continuously operable in either an alpha numeric or numeric mode to translate said signals into binary coded output signals each including a clock signal and a signal operable to cause the output signals of the translator to be recorded by the utilizing device, means operably associated with said second and first mentioned means to group said output signals into computer words, and means operable in conjunction with said second means to produce an output signal to indicate the end of a computer word.

3. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals a control circuit selectively operative in response to said input and counting circuits to provide a pair of output signals for each alpha numeric coded input signal and to provide a single output signal for each numeric coded input signal, means for grouping said output signals into computer words, and means for including in said computer words, sign, finish and mode of operation information.

4. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal a counting circuit operably associated with said output circuit for counting said groups of output signals, a control circuit selectively operative in response to said input and counting circuits to provide a pair of output signals for each alpha numeric coded input signal and to provide a single output signal for each numeric coded input signal, and means for developing an error output signal when information is fed into the translator faster than the translator is capable of translating the information.

5. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals, and a control circuit selectively operative in response to said input and counting circuits to provide a pair of output signals for each alpha numeric coded input signal and to provide a single output signal for each numeric coded input signal, said input circuit including an input bi-stable multivibrator for each simultaneously received input signal one side of which has an input conductor connected directly to said input device and an output connector connected directly to said output circuit.

6. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals, and a control circuit selectively operative in response to said input and counting circuits to provide a pair of output signals for each alpha numeric coded input signal and to provide a single output signal for each numeric coded input signal, said output circuit including a plurality of nor circuits having input conductors thereto from a pair of other nor circuits in said output circuit and also having translator output conductors connected thereto, said pair of other nor circuits each including one input conductor thereto connected to said input circuit and another input conductor thereto the signal on which is determined by the count of said counting circuit in conjunction with the mode of operation of the translator.

7. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals, and a control circuit selectively operative in response to said input and counting circuits to provide a pair of output signals for each alpha numeric coded input signal and to provide a single output signal for each numeric coded input signal, said counting circuit including a plurality of series connected bi-stable multivibrators having complement input circuits, the first of said series connected multivibrators having output conductors connected to the input, output and control circuits for supplying thereto signals the voltage level of which changes alternately with the count of the counting circuit, said counting circuit also including a plurality of nor circuits having input conductors connected to said series connected multivibrators and producing a predetermined output signal on a predetermined count of the counting circuit.

8. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals, and a control circuit selectively operative in response to said input and counting circuits to provide a pair of output signals for each alpha numeric coded input signal and to provide a single output signal for each numeric coded input signal, said control circuit including a mode of operation selector circuit operable to select between alpha numeric and numeric operation of said translator.

9. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals, and a control circuit selectively operative in response to said input and counting circuits to provide a pair of output signals for each alpha numeric coded input signal and to provide a single output signal for each numeric coded input signal, said control circuit including a clear circuit operable to set said counting circuit to a 0 count and to prepare said input circuit to receive an input signal.

10. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals, and a control circuit selectively operative in response to said input and counting circuits to provide a pair of output signals for each alpha numeric coded input signal and to provide a single output signal for each numeric coded input signal, said control circuit including means operable to complete a cycle of operation of said translator and prepare the translator for a new cycle of operation.

11. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals, and a control circuit selectively operative in response to said input and counting circuits to provide a pair of output signals for each alpha numeric coded input signal and to provide a single output signal for each numeric coded input signal, said control circuit including a punch actuating circuit operable to produce an output signal from the translator when it is desired to record the output signals present in the output circuit.

12. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of output signals, and a control circuit selectively operative in response to said input and counting circuits to provide a pair of output signals for each alpha numeric coded input signal and to provide a single output signal for each numeric coded input signal, said control circuit including an error circuit operable to produce a predetermined output in response to the reception of input signals at the input circuit faster than the translator is capable of translating them.

13. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal representing a binary coded number and a clock signal, a counting circuit operably associated with said output circuit for counting said groups of ouput signals, and a control circuit selectively operative in response to said input and counting circuits to provide a pair of output signals for each alpha numeric coded input signal and to provide a single output signal for each numeric coded input signal, said control circuit including a did operate circuit operable to cause said counting circuit to count each time a signal is received from a utilizing device indicating a signal from the translator has been recorded by said utilizing device and operable in conjunction with the counting circuit to reset said input circuit after translation of each of the signals received thereby.

14. A logical translator capable of operating in either an alpha numeric or numeric mode for translating signals received from an input device which are unsuited for use in a utilizing device such as an electronic computer into a form suitable for use in the utilizing device, comprising an input circuit for receiving time spaced groups of simultaneous input signals, each group of input signals representing alpha numeric or numeric coded information in binary form and a key signal, an output circuit operably associated with said input circuit for providing the utilizing device with time spaced groups of simultaneous output signals, each output signal including a binary coded number and a clock signal, a counting circuit operably associated with said output circuit for counting said groups of output signals, a control circuit selectively operative in response to said input and counting circuits to provide a pair of output signals for each alpha numeric coded input signal and to provide a single output signal for each numeric coded input signal including a mode of operation selector circuit operable to select between alpha numeric and numeric operation of the translator, a clear circuit operable to set the counting circuit to a zero count and to prepare the input circuit to receive an input signal, a close circuit operable to complete a cycle of operation of said translator and prepare the translator for a new cycle of operation, a punch actuating circuit operable to produce an output signal from the translator when it is desired to record the output signals present in the output circuit and a did operate circuit operable to actuate said counting circuit for counting each time a signal is received from a utilizing device indicating a signal from the translator has been recorded by said utilizing device and operable in conjunction with the counting circuit to reset said input circuit after translation of each of the signals received thereby, means operably associated with the output circuit for grouping the output signals into computer words including sign, finish and mode of operation information, and means operably associated with said output and input circuits for developing an error output signal when information is fed into the translator faster than the translator is capable of translating the information.

15. Structure as set forth in claim 14 wherein said input circuit includes an input bi-stable multivibrator for each simultaneously received input signal, one side of which has an input conductor connected directly to said input device and an output conductor connected directly to said output circuit.

16. Structure as set forth in claim 15 wherein the output circuit includes a plurality of pairs of nor circuits each including one input conductor thereto connected to said input circuit and another input conductor thereto the signal on which is determined by the count of said counting circuit and the mode of operation of the translator and other nor circuits each of which have input conductors connected thereto from one of the plurality of pairs of nor circuits in said output circuit and also have translator output conductors connected thereto.

17. Structure as set forth in claim 16 wherein said counting circuit includes a plurality of series connected bi-stable multivibrators having complement input circuits, the first of said series connected multivibrators having output conductors connected to the input, output and control circuits for supplying thereto signals the voltage level of which changes alternately with the count of the counting circuit, said counting circuit also including a plurality of nor circuits having input conductors connected to said series connected multivibrators and producing a predetermined output signal on a predetermined count of the counting circuit.

References Cited by the Examiner

UNITED STATES PATENTS

| | | | |
|---|---|---|---|
| 2,702,380 | 2/1955 | Brustman | 340—172.5 |
| 2,847,657 | 8/1958 | Hartley | 340—172.5 |
| 2,885,659 | 5/1959 | Spielberg | 340—172.5 |
| 3,008,127 | 11/1961 | Block | 340—172.5 |
| 3,028,088 | 4/1962 | Dunham | 340—172.5 X |
| 3,051,929 | 8/1962 | Smith | 340—172.5 |

ROBERT C. BAILEY, *Primary Examiner.*

EVERETT R. REYNOLDS, MALCOLM A. MORRISON, *Examiners.*